CORRELATOR

Filed March 27, 1962

2 Sheets-Sheet 1

AUTO-CORRELATION OF A SINE WAVE

AUTO-CORRELATION OF RANDOM NOISE

AUTO-CORRELATION OF SINE WAVE PLUS RANDOM NOISE

INVENTORS
JOHN S. GERIG,
HAROLD C. GLASS,
GERHARD E. HOFFMANN
& WARREN L. HOLFORD
BY Hurvitz & Rose
ATTORNEYS Oct. 18, 1966 J. S. GERIG ET AL 3,280,318

CORRELATOR

Filed March 27, 1962 2 Sheets-Sheet 2

INVENTORS
JOHN S. GERIG,
HAROLD C. GLASS,
GERHARD E. HOFFMANN
& WARREN L. HOLFORD

BY Hurvitz & Rose

ATTORNEYS

United States Patent Office 3,280,318

Patented Oct. 18, 1966

3,280,318

CORRELATOR

John S. Gerig, McLean, Harold C. Glass, Vienna, Gerhard E. Hoffmann, Fairfax, and Warren L. Holford, Springfield, Va., assignors to Scope, Incorporated, Falls Church, Va., a corporation of New Hampshire Filed Mar. 27, 1962, Ser. No. 182,821

5 Claims. (Cl. 235—181)

The present invention relates generally to devices for deriving signals corresponding with mathematical functions of other signals, and more particularly to devices for obtaining the autocorrelation function of a given signal, or the cross correlation function of a pair of signals.

It is known that signals which are time functions, and which correspond with autocorrelation or cross correlation functions of a given signal or signals, the latter representing further time functions, have many uses in the art of communication, the word "communication" being given its broadest meaning. Derivation of the autocorrelation and cross correlation functions of time varying signals is of primary importance in the field of the statistical theory of communications.

Briefly, in order to derive the autocorrelation function of a signal, the signal is applied to means which introduces a series of delays into the signal and the original signal is multiplied by its own delayed values. If the $n$th delay by $\tau_n$, then the product of the original signal after it has suffered any predetermined delay $\tau_n$, may be represented as $$V_n = f_1(t) f_1(t+\tau_n)$$

If the output of each multiplier is applied to a separate integrator and there averaged, we have for each integrator output the value $$\phi_n = \frac{1}{2T}\int_{-T}^{T} f_1(t) f_1(t+\tau_n)\,dt$$

which is, in the limit as T approaches infinity, the autocorrelation function.

Devices for producing autocorrelation functions of given time functions are known in the art. In one such device a multi-section tapped delay line is used, whose input feeds one input lead of each of a group of analog multipliers, each tap on the delay line being connected to the other input lead of a different one of the multipliers. The output of the $n$th multiplier is, therefore, $$\phi_n = (1/2T) f_1(t) f_1(t+\tau_n)$$

where $f_1(t)$ is the signal and $\tau_n$ is the delay produced between the input of the delay line and the $n$th tap. The output of each multiplier may be led to an integrator and there averaged, the integrator being constituted of electrical components such as condensers and resistors. Each integrator output will then be $$\phi_n = \frac{1}{2T}\int_{-T}^{T} f_1(t) f_1(t+\tau_n)\,dt$$

which is, in the limit as T approaches infinity, the autocorrelation function. In practice, if T is very much greater than $\tau_n$, as will usually be the case, the last equation will be a very good approximation to the actual autocorrelation function. If we scan the outputs of the integrators, we have $\phi$ as a time varying function. If desired, the function $\phi$ may be Fourier transformed, giving in response to $\phi$ produce the power spectrum of the original signal. However, many other uses may be found for the autocorrelation function, as such, or considered as a function of time.

The difficulty with the devices of the prior art for producing the autocorrelation function involves principally the fact that the equipment required is extremely complex, if a considerable number of delays $\tau_n$ are to be employed. Additionally, only finite values of the integration time T can be obtained and accordingly the integral, which ideally corresponds with a value of the autocorrelation function only for infinite integration times, is actually an approximate integral, by reason of the finite integration times utilized.

It is, accordingly, desirable to produce a device for generating the autocorrelation function as a time function by means of relatively simple apparatus, preferably by means of apparatus which involves infinitesimal delay intervals, a long maximum delay range, and an integration time that is very long in comparison to the maximum delay of the device.

In general, correlation analysis provides a measure of the degree of interrelationship between two time-dependent functions. If the two time functions being correlated have a common periodicity, the correlation function will have the same periodicity in $\tau$ that the two time functions had in $t$. For example, if the function $f(t)=A \sin wt$ is autocorrelated, the correlation function will be $$\phi(\tau) = A^2/2 \cos w\tau$$

Autocorrelation of a random function such as noise, however has a maximum at $\tau=0$ but approaches zero (if there is no D.C. component) for values of $\tau$ that are large compared to the reciprocal of the noise bandwidth. The difference between the correlation functions of periodic and random signals is one of the more valuable properties of this type of analysis. It is this property that provides signal-to-noise ratio enhancement in correlation detectors. Another valuable property of correlation analysis is its inherent ability to determine the relative delay between two coherent signals, either periodic or random. Assume, for example, two coherent random functions, one of which has been delayed with respect to the other. The cross-correlation of these two functions will produce a maximum at the value of $\tau$ equal to the delay imposed on one of the signals. In general, one is able to distinguish clearly $\phi_{max}(\tau)$ because of the sharp maximum at this point.

The solution of the cross-correlation function requires the multiplication of $f_1(t)$ with $f_2(t+\tau)$ for all values of $\tau$ within the range of interest and the summation of each result over a period of time sufficiently long to yield a practical approximation to infinite integration. From this it is easily understood why the various mechanical and electrical correlators that have been developed for the experimental determination of the correlation function have either been quite large and complex or required inordinately long periods of time to arrive at a solution.

The electrooptical video correlator of the present invention employs the relatively low propagation velocity of ultrasonic waves in liquids and the high resolution capability of optics to achieve instantaneous correlation over a continuum of relative delay ($\tau$) with comparatively little equipment. This correlator consists essentially of two electronically controlled ultrasonic delay lines, a collimated light beam, and a television vidicon tube. The two ultrasonic delay lines provide the required relative time delay while simultaneously modulating the collimated light beam—thereby performing a multiplication of two video signals over a continuous range of delay. The information bearing light beam is projected on the photoconductive surface of the vidicon tube which, due to its response time, performs a time integration. Electronic scanning of the vidicon tube produces a waveform of the correlation function for all delay time values of interest.

A key element in the electrooptical correlator is the ultrasonic cell, which simultaneously provides signal delay and the modulation of light leading to the multiplication operation. In such a cell, a quartz crystal transducer sets up an ultrasonic beam of plane waves which are propagated in an optically transparent liquid medium. If water, with a propagation velocity of 1500 meters per second, is used as the liquid medium, a 100-microsecond delay can be obtained in a path length of 15 centimeters.

The optical effect of the ultrasonic waves may be observed if a collimated light beam is passed through the medium perpendicular to the ultrasonic beam axis and then focused to the image of the original source of light. The light is diffracted by the alternate rarefaction and compression of the liquid in the ultarsonic beam, forming an interference pattern that is analogous to that formed by a diffraction grating in that light is diffracted out of the zero-order image of the source.

When sufficient carrier voltage is applied to the quartz-crystal, practically all of the light is diffracted out of the zero-order image. By applying downward modulation to the quiescent carrier voltage, an increase in the amount of light in the zero-order may be effected. This method may therefore be used to produce light modulation.

By means of apertures and additional optics, the zero-order image of the first ultrasonic cell can be imposed upon a second ultrasonic cell and in this manner, modulation signals contained in two ultarsonic cells may be multiplied together, one delayed with respect to the other. The quiescent carrier may be chosen so as to establish an operating point anywhere along the straight-line portion of the operating curve of the cell, but to simplify the explanation of how multiplication occurs, assume an operating point at the point of minimum light transmission and assume that the transmissivity of the cell at this point is zero. Also assume that the modulating voltage is unipolar and that it serves to downwardly modulate the carrier. The zero-order light transmitted by the first cell $L_1$ may be expressed as:

$$L_1=L_0T_1$$

where $L_0$ is the light incident on the first cell and $T_1$ is the transmissivity of the first cell. The zero-order light transmitted by the second cell is similarly given by:

$$L_2=L_1T_2$$
$$=L_0T_1T_2$$

where $T_2$ is the transmissivity of the second cell. Inasmuch as zero-order cell transmissivity is a function of modulating voltage, the above equation may be written as:

$$L_2=k^2L_0V_{m_1}V_{m_2}$$

If the operating point had been chosen at any other point along the curve a constant term would have been introduced in the above product which would vanish when integration was performed.

To illustrate the manner in which one modulating signal is delayed with respect to the other, assume that a water medium is used in cells 15 cm. long, providing a propagation time of 100 microseconds in each cell. Optical superposition is accomplished by placing the cells side by side, and intervening optics are utilized which permits the passage of only zero-order light. The two cells are fed with signal from opposite ends. Since $\tau$ in the correlation function represents the relative delay of one signal, $f_2(t)$, with respect to the other, $f_1(t)$, the center of the two cells is the point where $\tau=0$. In the upper half of the cells $f_2(t)$ is delayed with respect to $f_1(t)$ and in the lower half, $f_2(t)$ is advanced with respect to $f_1(t)$. Therefore the upper half stands for positive values of $\tau$ while the lower half stands for negative values. The relative delay goes from zero at the center of the two cells to 100 microseconds at the top because of the double delay action of the two-cell arrangement. Thus a 100-microsecond delay is achieved over a 7½ cm. linear distance, which reduces by one-half the size requirements of the optical system. Since negative values of $\tau$ are seldom of interest, the bottom half of the first cell can be eliminated, as could the lower half of the second cell if an external 50-microsecond delay is provided. The resultant light transmitted throughout the upper half represents the product of $f_1(t)$ and $f_2(t+\tau)$ for all values of $\tau$ from 0 to 100 microseconds with a resolution determined by Rayleigh's criterion for the discrimination of two point sources as a function of the ultrasonic wavelength. For a 10-megacycle carrier in water, the resolution is one part in 1640, or the equivalent of a delay line with 1640 taps.

It is, accordingly, a broad object of the present invention to provide an optical correlator having improved optics.

It is another object of the invention to provide an optical system for an optical correlator employing ultrasonic cell delay device which employs a single order of the diffraction pattern generated by cell, and more specifically the zero order image.

A further object of the invention relates to the modulation of light by an ultrasonic cell, in which the light is modulated by sonic waves traversing the cell, and in which the sonic waves are generated in response to a carrier having an amplitude such as to diffract light of a single given order to an aperture, modulation being accomplished by applying downward modulation to the quiescent carrier.

A further object of the invention resides in the provision of a correlation device in which light is applied to two ultrasonic cells in cascade, the cells being driven ultrasonically at optically opposite ends, whereby zero of time is located at other than the end of at least one of the cells and the total delay time available to the system can be longer by a factor of two than the delay time available in at least one of the cells.

It is still another object of the invention to provide an optical correlation system employing folded or re-entrant optics, in order to reduce the total number of lenses employed in the system.

A further object of the invention resides in the method of video modulation of the ultrasonic carrier, whereby vestigial sideband techniques are utilized to minimize the bandwidth handling requirements of the ultrasonic transducer.

The above and still further objects, features and advantages of the present invention will become apparent upon consideration of the following detailed description of one specific embodiment thereof, especially when taken in conjunction with the accompanying drawings, wherein.

Figure 1:
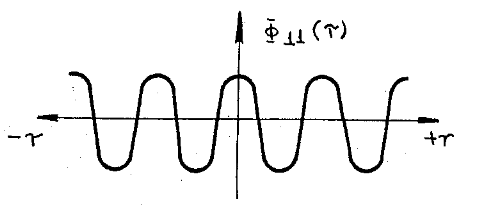
FIGURES 1, 2 and 3 are, respectively, plots of the autocorrelation of a sine wave, of random noise, and of the sum of these.
Figure 2:
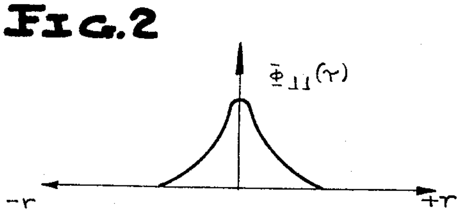
Figure 3:
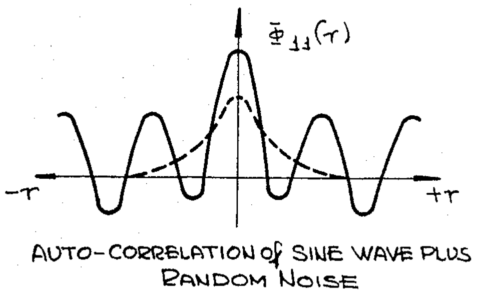

Referring now to FIGURES 1–5 of the accompanying drawings, FIGURE 1 shows the sinusoidal character of the autocorrelation function of a sine wave, plotted as a function of delay time, while FIGURE 2 illustrates a corresponding plot for random noise. FIGURE 3 illustrates the sum of FIGURES 1 and 2, to stress that the content of FIGURE 1 can be derived in the presence of random noise, because the autocorrelation function of random noise is essentially zero at appreciable values of delay.

Figure 4:
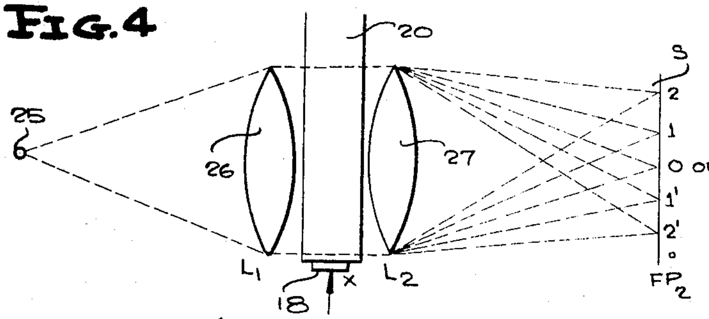
FIGURE 4 is a view in side elevation of the basic optical system employed in the present invention.

In the system of FIGURE 4, a source of coherent light 25, has its output collimated by a lens 26 and applied to an ultrasonic delay line 20, supplied with carrier from a driver (not shown), which drives a supersonic transducer 18. The supersonic waves pass vertically upward through the cell 20, such that the light rays travel parallel to the supersonic wave fronts. On emerging from the cell 20 the rays are conveyed by lens 27 on a screen S. It is then found that the image of the source 25 is diffracted, the cell 20 acting on the light like a diffraction grating, by virtue of the variable density patterns of the optical material in the cell. The input light deriving from source 25 is divided, by virtue of the diffraction, into multiple images. One such image, called the zero order image, is undiffracted. Images on opposite sides of the zero image are identified as first, second, etc. order images. The intensity of the supersonic wave then determines the division of luminous energy among the several orders of diffraction and particularly the zero order image can be reduced to approximately zero intensity.

Figure 5:
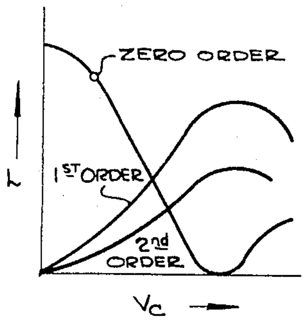
FIGURE 5 is a plot of zero order light passed by the structure of FIGURE 4 versus ultrasonic carrier intensity.
Figure 6:
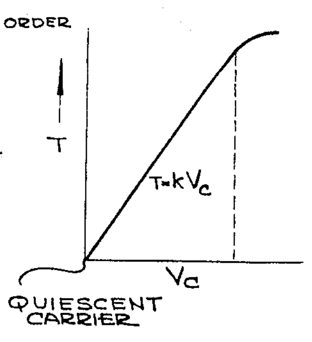
FIGURE 6 is a plot of zero order transmissivity of the system of FIGURE 4 as a function of carrier voltage.
Figure 7:
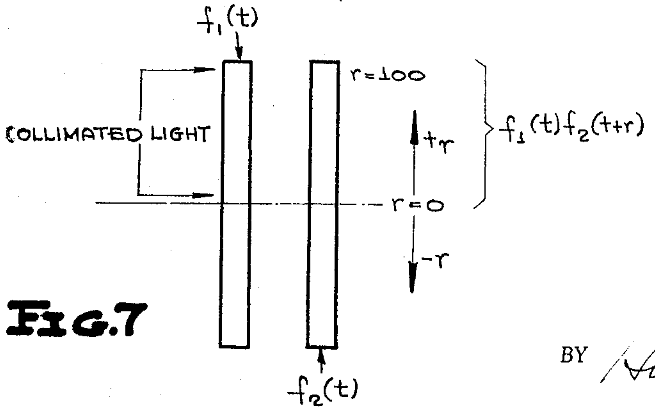
FIGURE 7 is a schematic representation of a part of an optical system according to the invention, employing cascaded optical delay lines, and arranged to permit use of folded optics.

FIGURES 5 and 6 illustrate zero-order light intensity versus carrier amplitude, and zero-order transmissivity versus carrier amplitude, for the system of FIGURE 4, these plots being derived from each other, in the sense that in FIGURE 6 zero transmissivity occurs for a specific quiescent carrier level, and transmissivity increases with decreasing carrier.

Figures 8, 9, 10:
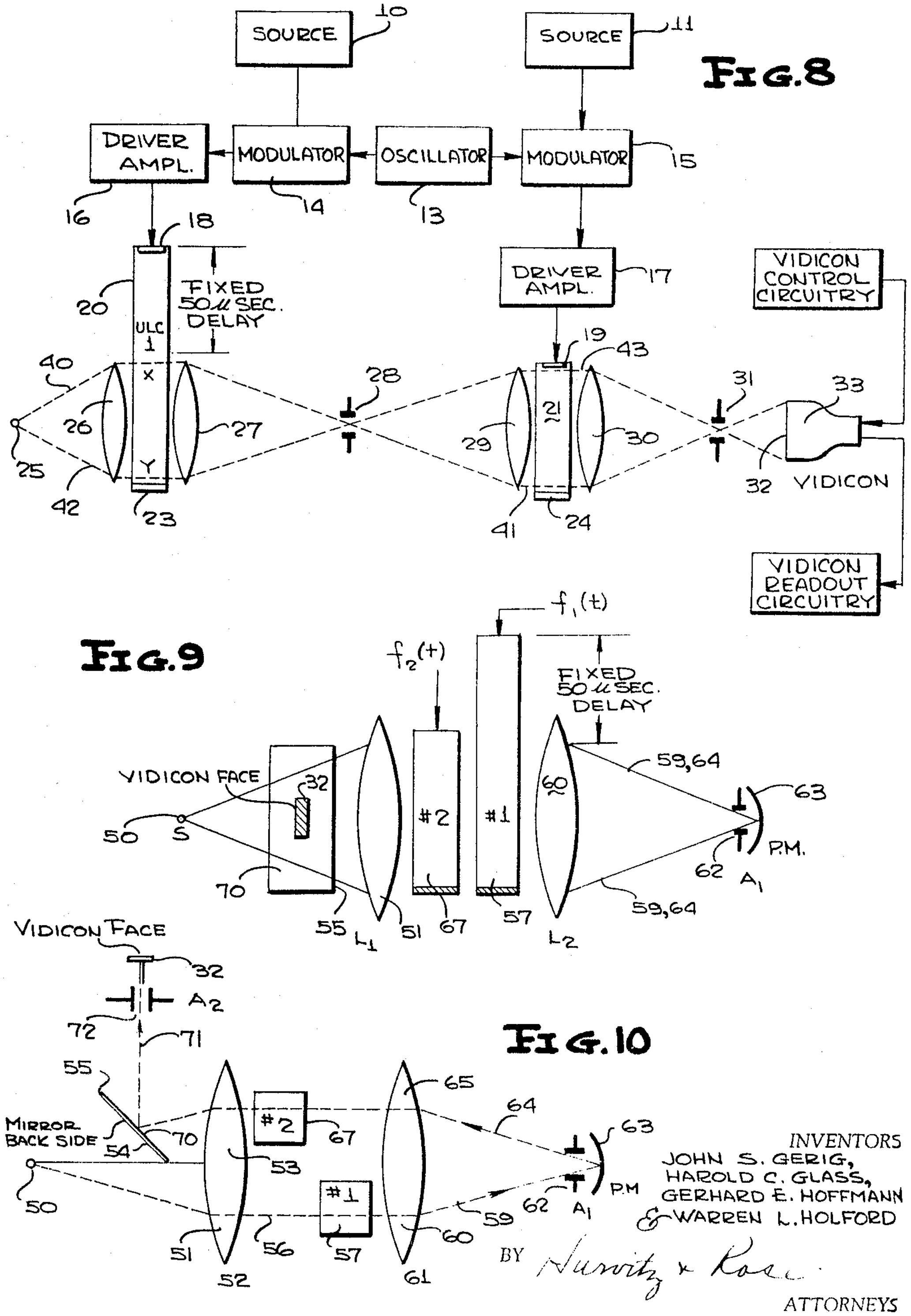
FIGURE 8 is a schematic block diagram of a first embodiment of a complete system according to the invention.
FIGURES 9 and 10 are top and side views, respectively, of a modification of the system of FIGURE 7.

Referring now more particularly to FIGURE 8 of the accompanying drawings, the reference numeral 10 denotes a source of a signal, which is a function of time, and which may be denoted arbitrarily as $f_1(t)$. A further such source 11 provides a similar function, $f_2(t)$. In application to a radar system, $f_1(t)$ may be composed of received echo signal plus noise, whereas $f_2(t)$ may be composed of the locally generated transmitter signal. The problem to be solved may be that of abstracting the echo pulses from the noise. In a more general sense, the problem is that of abstracting elements common to two signals, to the exclusion of dissimilar elements, or elements not common to the two signals.

As oscillator 13 is provided, having typically a frequency of 10 mc. The frequency employed is a matter of choice, 10 mc. being easy to generate, providing ultrasonic drivers of convenient size, and relatively small attenuation in water or other liquids suitable as ultrasonic media.

The oscillator 13 drives a pair of modulators 14, 15. The modulator 14 is supplied with driving signal from source 10, and the modulator 15 from source 11. The signals $f_1(t)$ and $f_2(t)$ are selected to produce only downward modulation in the outputs of modulators 14 and 15. The modulators 14 and 15 supply modulated carrier to driver amplifiers, 16, 17, respectively, and these in turn drive piezoelectric crystal transducers 18 and 19, respectively. The overall bandpass characteristics of each channel consisting of driver amplifier 16 and piezoelectric crystal transducer 18 as well as drive amplifier 17 and piezoelectric crystal transducer 19 is achieved by means of staggered tuned circuits to yield vestigial sideband operation of the individual channels. To alleviate the need for loading the piezoelectric crystal transducer to cover twice the desired bandwidth as would be required with double sideband amplitude modulation. The bandpass characteristic of the piezoelectric crystal transducer is used as the lower stage of a staggered amplifier, the additional stages being realized in driver amplifiers 16 and 17. The supersonic carrier frequency is centered on the lower 3 db point of the piezoelectric crystal transducer bandpass characteristic.

Assume that the ultrasonic medium is water, having a propagation velocity of 1500 meters/second. A 100 microsecond delay can then be attained in a path length of 15 cm. The reference numerals 20 and 21 designate then, elongated transparent containers for ultrasonic media, called cells. Each cell terminates in an absorber of ultrasonic waves, to prevent reflections, these being 23, in cell 20, and 24 in cell 21. The cell 21 is half as long as the cell 20, for reasons which will become apparent as the description proceeds.

Light from a source 25, preferably filtered to be monochromatic, is collimated by a lens 26 so that light rays pass parallel to the sonic wave fronts through the cell 20. On emerging from the cell 20 the light rays are focused by a lens 27 on a small aperture or pin hole 28. On passing beyond the aperture 28 the light rays diverge toward a further lens 29, which again collimates the rays so that they pass through cell 21 parallel to the sonic wave fronts therein. On emerging from the cell 21 the rays are converged by lens 30 to a second small aperture or pin hole 31, from which the rays diverge to impinge on the face 32 of a vidicon 33. The latter is supplied with conventional vidicon control circuitry, which provides vertical scan of the read-out beam of the vidicon, and vidicon read-out circuitry which provides an output video signal responsive to the pattern generated on the face 32 of the vidicon 33, and read off by the scanning beam.

The aperture 28 is arranged to pass only the zero order image of the light diffracted by cell 20. As the carrier signal provided by oscillator 13 is modulated downwardly by the signal supplied by source 10, additional light passes the aperture.

The operating point of the cells i.e. the values of the quiescent carriers, are selected so as to establish an operating point anywhere along the straight line portion of the cell characteristic. However, for simplicity of explanation, it can be assumed that the value of the quiescent carrier is such as to reduce the light transmissivity of the cell and aperture to zero. As the value of the carrier is reduced by an input signal, then, more light is caused to pass the aperture, the quantity of light being proportional to the reduction of carrier from its quiescent value.

The light which passes the aperture 28 is an image of the transmissivity of the lower half of the cell 20, as viewed in FIGURE 8, i.e. the image portrays the diffractions of the light rays as they emerge from the cell 20, for each point along the cell. This image is passed through the cell 21, which results in a further modulation of the light, so that the light as it arrives at the face 32 of vidicon 33 will represent, for each vertical position along the face 32, of a product of signal intensities of the signals supplied by sources 10 and 11.

For example, the ray 40 is modulated in intensity in response to signal $f_1(t)$ with delay $\tau=0$, where $\tau$ is the relative delay of one signal relative to the other, $f_2(t)$. The ray 40 passes as ray 41 through the cell 21 at a point such that the total delays of the signals starting from transducers 18, 19, are equal. The ray 42 on the other hand is modulated with a delay equal to the total length of cell 20, whereas ray 43 is moduated with a zero delay in cell 21. It follows that the value of $\tau$, i.e. the relative delays, is twice the maximum delay afforded by cell 21, or is equal to the total delay afforded by cell 20. The optical elements, i.e. lenses 26, 27, 29, 30 are appropriate to only half the length of cell 20.

The system of FIGURE 8 requires a total of four lenses, and two apertures. In the system of FIGURE 9 a total of two lenses are employed, each lens performing two functions.

In FIGURES 9 and 10, a source of light 50 applies a divergent beam to one half 51 of a lens 52, the remaining half 53 of lens 52 being blocked by the back side 54 of a mirror 55, with respect to source 50. The lens half 51 collimates the light impinging thereon from source 50 into parallel rays, represented by 56. These pass through the cell 57, and thence are conveyed as rays 59 by one half 60 of lens 61 to an aperture 62. A reflecting mirror 63, preferably parabolic or spherical, returns the rays, as at 64 via the remaining half 65 of lens 61, to the cell 67. The latter modulates the light, in response to an electrical signal $f_2(t)$, and the light outgoing from cell 67 is impressed by the upper half 53 of lens 52 to the reflecting surface 70 of mirror 55. The latter directs the rays, as at 71, to an aperture 72, whence the light proceeds to the face 32 of vidicon 33 (not shown).

The cell 57 is identical with the cell 20 of FIGURE 8; and the cell 67 is identical with the cell 21 of FIGURE 8, the cells performing the same functions in the several figures. The modes of operation of the system are identical, electrically and optically, the sole distinction residing in the double utilization of each lens in the system of FIGURES 8 and 9.

In a practical embodiment of the present system the delay time $\tau$ employed is 100 microseconds, the carrier frequency is 10 mc. and the modulation bandwidth is 2 megacycles. A conventional vidicon may be assumed to have 600 line resolution, and an integration time of about 100 milliseconds. The delay time bandwidth product is thus about 200. This represents a figure of merit for the system, which can be improved by using a higher resolution vidicon.

While I have described and illustrated one specific embodiment of my invention, it will be clear that variations of the details of construction which are specifically illustrated and described may be resorted to without departing from the true spirit and scope of the invention as defined in the appended claims.

We claim:

1. A light modulator, comprising a source of light, an ultrasonic cell light modulator, means conveying said light from said source through said cell in a direction transversely of said cell, a source of ultrasonic carrier, a transducer coupled to one end of said cell and capable of creating ultrasonic waves in said cell traveling lengthwise of said cell, said light passing through said cell passing parallel to the wave fronts of said waves, means connecting said source of ultrasonic carrier to said transducer, means condensing the output light from said cell to substantially a point, an aperture at said point, means adjusting the amplitude of said carrier to reduce $n$th order diffraction effects at said aperture, where $n$ is an integral, to substantially zero transmissivity, a source of unipolar modulating signal, and means for applying said source of unipolar modulating signal to modulate said carrier only in the sense of decreasing amplitude, whereby to solely increase said $n$th order transmissivity in response to said modulating signal.

2. The combination according to claim 1 wherein $n=0$.

3. An optical correlator comprising a first and second birefracting, transparent, sonic delay line, means for introducing a sonic energy signal to each of said delay lines, said means each being located at corresponding ends of their respective delay lines to cause the signals introduced into both lines to travel in corresponding directions, means for transmitting a beam of light serially through said two delay lines, means for integrating the light pattern emergent from said two delay lines, and means, including a lens and pin point aperture, interposed between said first and second delay lines for selecting light of only one order of diffracted images for further diffraction by the second delay line wherein one of said sonic delay lines has a delay approximately twice as great as the other sonic delay lines.

4. An optical correlator comprising a first and second birefracting, transparent, sonic delay line, means for introducting a sonic energy signal to each of said delay lines, said means each being located at corresponding ends of their respective delay lines to cause the signals introduced into both lines to travel in corresponding directions, means for transmitting a beam of light serially through said two delay lines, means for integrating the light pattern emergent from said two delay lines, and means, including a lens and pin point aperture, interposed between said first and second delay lines for selecting light of only one order of diffracted images for further diffraction by the second delay line wherein is provided a fixed delay device at the input of one of said sonic delay devices, said delay being comparable with the total delay of the other of said sonic delay lines.

5. An optical correlator, comprising first means for transforming a first input signal into a form capable of affecting a beam of light in accordance with the waveform of the signal, second means for transforming a second input signal into a form capable of affecting said beam of light in accordance with the waveform of the second signal, a lens system consisting of first and second lenses, said first and second means being located between said first and second lenses, a reflector, means for directing said beam of light via said first and second means and said first and second lenses to said reflector, said reflector being arranged to reflect said beam of light back through said first and second means and said first and second lenses to form an image.

References Cited by the Examiner

UNITED STATES PATENTS

| | | | |
|---|---|---|---|
| 2,418,964 | 4/1947 | Arenberg. | |
| 2,664,243 | 12/1953 | Hurvitz | 235—181 |
| 2,943,315 | 6/1960 | Rosenthal. | |

MALCOLM A. MORRISON, *Primary Examiner.*

C. L. JUSTUS, K. CLAFFY, *Examiners.*

K. W. DOBYNS, P. M. HINDERSTEIN, *Assistant Examiners.*